United States Patent
Fuller et al.

(10) Patent No.: US 9,405,582 B2
(45) Date of Patent: Aug. 2, 2016

(54) DYNAMIC PARALLEL DISTRIBUTED JOB CONFIGURATION IN A SHARED-RESOURCE ENVIRONMENT

(71) Applicant: International Business Machines Corporation, Armonk, NY (US)

(72) Inventors: Nicholas C. M. Fuller, North Hills, NY (US); Vijay K. Naik, Pleasantville, NY (US); Liangzhao Zeng, Yorktown Heights, NY (US); Li Zhang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 112 days.

(21) Appl. No.: 14/309,938

(22) Filed: Jun. 20, 2014

(65) Prior Publication Data

US 2015/0370603 A1     Dec. 24, 2015

(51) Int. Cl.
G06F 9/46       (2006.01)
G06F 9/50       (2006.01)
G06F 9/48       (2006.01)
G06F 9/445      (2006.01)
G06F 9/455      (2006.01)

(52) U.S. Cl.
CPC .......... *G06F 9/5011* (2013.01); *G06F 9/44505* (2013.01); *G06F 9/4881* (2013.01); *G06F 9/45533* (2013.01)

(58) Field of Classification Search
None
See application file for complete search history.

(56) References Cited

U.S. PATENT DOCUMENTS

| | | | |
|---|---|---|---|
| 5,273,019 A | 12/1993 | Matthews et al. | |
| 8,365,181 B2 * | 1/2013 | Flower | G06F 9/5033 709/201 |
| 8,447,852 B1 | 5/2013 | Penumaka et al. | |
| 8,555,077 B2 | 10/2013 | Davis et al. | |
| 8,706,798 B1 * | 4/2014 | Suchter | G06F 9/5038 709/202 |

(Continued)

FOREIGN PATENT DOCUMENTS

WO     2012158649 A2    11/2012

OTHER PUBLICATIONS

Brunt et al., "A Conceptual Framework for Adaptation", This work is supported by the European Integrated Project 257414 ASCENS, pp. 1-33, DOI 10.1145/0000000.0000000, website: <http://doi.acm.org/10.1145/0000000.0000000>.

(Continued)

*Primary Examiner* — Gregory A Kessler
(74) *Attorney, Agent, or Firm* — Stephen Darrow; David B. Woycechowsky

(57)     ABSTRACT

Dynamically adjusting the parameters of a parallel, distributed job in response to changes to the status of the job cluster. Includes beginning execution of a job in a cluster, receiving cluster status information, determining a job performance impact of the cluster status, reconfiguring job parameters based on the performance impact, and continuing execution of the job using the updated configuration. Dynamically requesting a change to the resources of the job cluster for a parallel, distributed job in response to changes in job status. Includes beginning execution of a job in a cluster, receiving job status information, determining a job performance impact, requesting a changed allocation of cluster resources based on the determined job performance impact, reconfiguring one or more job parameters based on the changed allocation, and continuing execution of the job using the updated configuration.

18 Claims, 8 Drawing Sheets

(56) References Cited

U.S. PATENT DOCUMENTS

2009/0031316 A1* 1/2009 Richoux ............... G06F 9/5066
718/102
2013/0254196 A1* 9/2013 Babu ................. G06F 17/30595
707/736

OTHER PUBLICATIONS

Bu, "Autonomic Management and Performance Optimization for Cloud Computing Services", Dissertation Submitted to the Graduate School of Wayne State University, Detroit, Michigan, © Copyright by Xiangping Bu, 2013, pp. i-153.
Gunarathne et al, "MapReduce in the Clouds for Science", 2010 IEEE Second International Conference on Cloud Computing Technology and Science (CloudCom), Nov. 30, 2010-Dec. 3, 2010, pp. 565-572, E-ISBN: 978-0-7695-4302-4, DOI: 10.1109/CloudCom.2010.107.
Koehler et al., "An adaptive framework for the execution of data-intensive MapReduce applications in the Cloud", 2011 IEEE International Parallel & Distributed Processing Symposium, IEEE Computer Society, Copyright 2011 IEEE DOI 10.1109/IPDPS.2011.254, pp. 1122-1131.
Li et al., "MRONLINE: MapReduce Online Performance Tuning", HPDC'14, Jun. 23-27, Vancouver, BC, Canada, Copyright 2014 ACM 978-1-4503-2749-7/14/06, <http://dx.doi.org/10.1145/2600212.2600229>.
Park et al., "Locality-Aware Dynamic VM Reconfiguration on MapReduce Clouds", HPDC'12, Jun. 18-22, 2012, Delft, The Netherlands, Copyright 2012 ACM 978-1-4503-0805-2/12/06, pp. 27-36.
Phan et al., "Real-time MapReduce Scheduling", University of Pennsylvania, 2010, pp. 1-6.
U.S. Appl. No. 14/176,635, entitled "Dynamic Resource Allocation in Mapreduce", filed Feb. 10, 2014.
U.S. Appl. No. 14/176,679, entitled "Enabling Dynamic Job Configuration in Mapreduce", filed Feb. 10, 2014.
U.S. Appl. No. 14/262,056, entitled "Dynamic Tuning of Memory in Mapreduce Systems", filed Apr. 25, 2014.
Vecchiola et al, "Aneka: A Software Platform for .Net-based Cloud Computing", GRIDS-TR-2009-4, Grid Computing and Distributed Systems Laboratory, The University of Melbourne, Australia, May 25, 2009, arXiv:0907.4622v1 [cs.DC].

* cited by examiner

DYNAMIC PARALLEL DISTRIBUTED JOB CONFIGURATION IN A SHARED-RESOURCE ENVIRONMENT

BACKGROUND OF THE INVENTION

The present invention relates generally to the field of parallel, distributed programming, and more particularly to execution optimization of parallel, distributed programs.

MapReduce is a generic programming model for processing parallelizable problems. MapReduce applications can process large data sets in parallel by coordinating the resources of a large number of physical and/or virtual computers, known collectively as a cluster or grid. In the MapReduce programming paradigm, a job is submitted for processing, which is then broken down into pieces known as tasks. These tasks are scheduled to run on the various nodes in the MapReduce cluster, with task assignments being made such that each node can work on its piece of the job in parallel with the work being done by other nodes.

As the name implies, each task in a MapReduce job is typically of one of two types: a map task or a reduce task. As a simple example, a MapReduce job might be to process all the words in a collection of books, counting the number of times each word occurs. A set of map tasks might be created, one for each book in the collection, with each task recording the frequency of occurrences of every word found in the book associated with that task. The output produced by these map tasks is then used as input to a set of reduce tasks. In this case, each word might have an associated reduce task, the job of which is to sum the frequencies of that word produced by all the map tasks. The distribution of work provided by MapReduce enables map tasks and reduce tasks to run on small subsets of larger sets of data, which both lowers processing latency and provides a high degree of scalability. Because of the potentially large size of MapReduce jobs and the ability to take advantage of custom-scaled processing, it may be attractive to run MapReduce jobs in a cloud environment (discussed further below).

SUMMARY

According to an aspect of the present invention, there is a method, computer program product and/or system that performs the following steps (not necessarily in the following order): (i) begins execution of a parallel, distributed job in a job cluster defined by an initial allocation of cluster resources, the job having an initial configuration of a plurality of job parameters; (ii) receives status information about the cluster; (iii) determines, based at least in part on the cluster status information, a performance impact to the job; (iv) reconfigures one or more job parameters of the plurality of job parameters, based, at least in part, on the determined job performance impact; and (v) continues execution of the job using the updated configuration. The job includes at least a first job task, and among the plurality of job parameters are parameters for the first job task.

According to another aspect of the present invention, there is a method, computer program product and/or system that performs the following steps (not necessarily in the following order): (i) begins execution of a MapReduce parallel, distributed job in a MapReduce job cluster defined by an initial allocation of cluster resources, the MapReduce job having an initial configuration of a plurality of job parameters; (ii) receives status information about the executing job; (iii) determines, based at least in part on the job status information, a performance impact to the job; (iv) requests a changed allocation of cluster resources, based, at least in part, on the determined job performance impact; (v) responsive to receiving a changed allocation of cluster resources, reconfigures one or more job parameters of the plurality of job parameters, based, at least in part, on the changed allocation; and (vi) continues execution of the job using the updated configuration. The job includes at least a first job task, and among the plurality of job parameters are parameters for the first job task.

DETAILED DESCRIPTION

Figure 1:
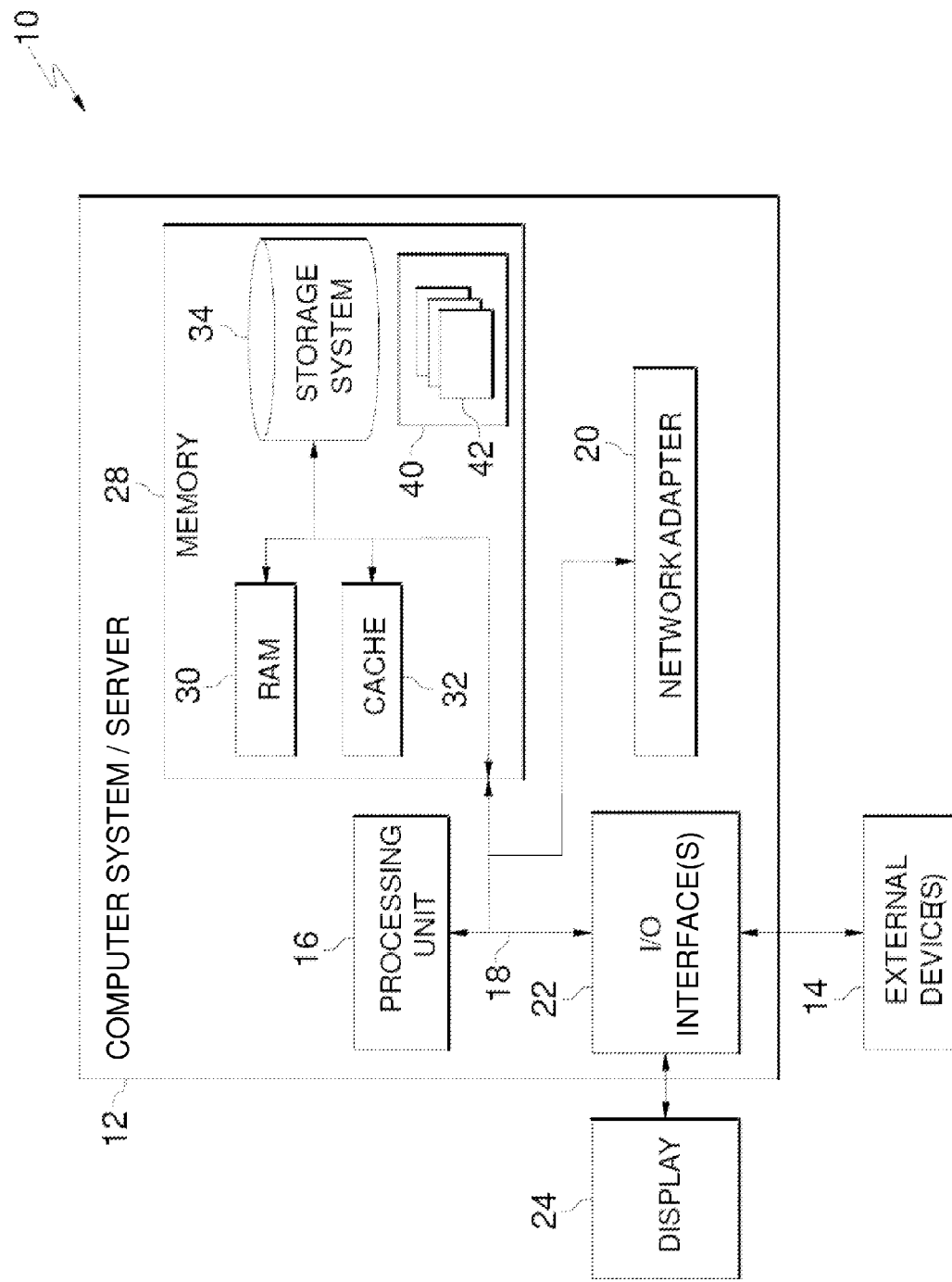
FIG. 1 depicts a cloud computing node of a system according to a first embodiment of the present invention.

Some embodiments of the present invention dynamically adjust the parameters of a parallel, distributed job in response to changes to the status of the job cluster in a shared-resource environment. Alternatively or in addition, some embodiments of the present invention dynamically request a change to the resources of the job cluster for a parallel, distributed job in response to changes in job status. The cluster status information may include information about cluster layers below the layer of the host virtual machine(s), and/or the changes to the cluster may include changes below that layer.

This Detailed Description section is divided into the following sub-sections: (i) The Hardware and Software Environment; (ii) Example Embodiment; (iii) Further Comments and/or Embodiments; and (iv) Definitions.

I. The Hardware And Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (for example, mobile phones, laptops, and personal digital assistants (PDAs)).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general-purpose or special-purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (for example, a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (for example, at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (for example, network card, modem, and so on) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (for example, the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, data archival storage systems, and so on.

Figure 2:
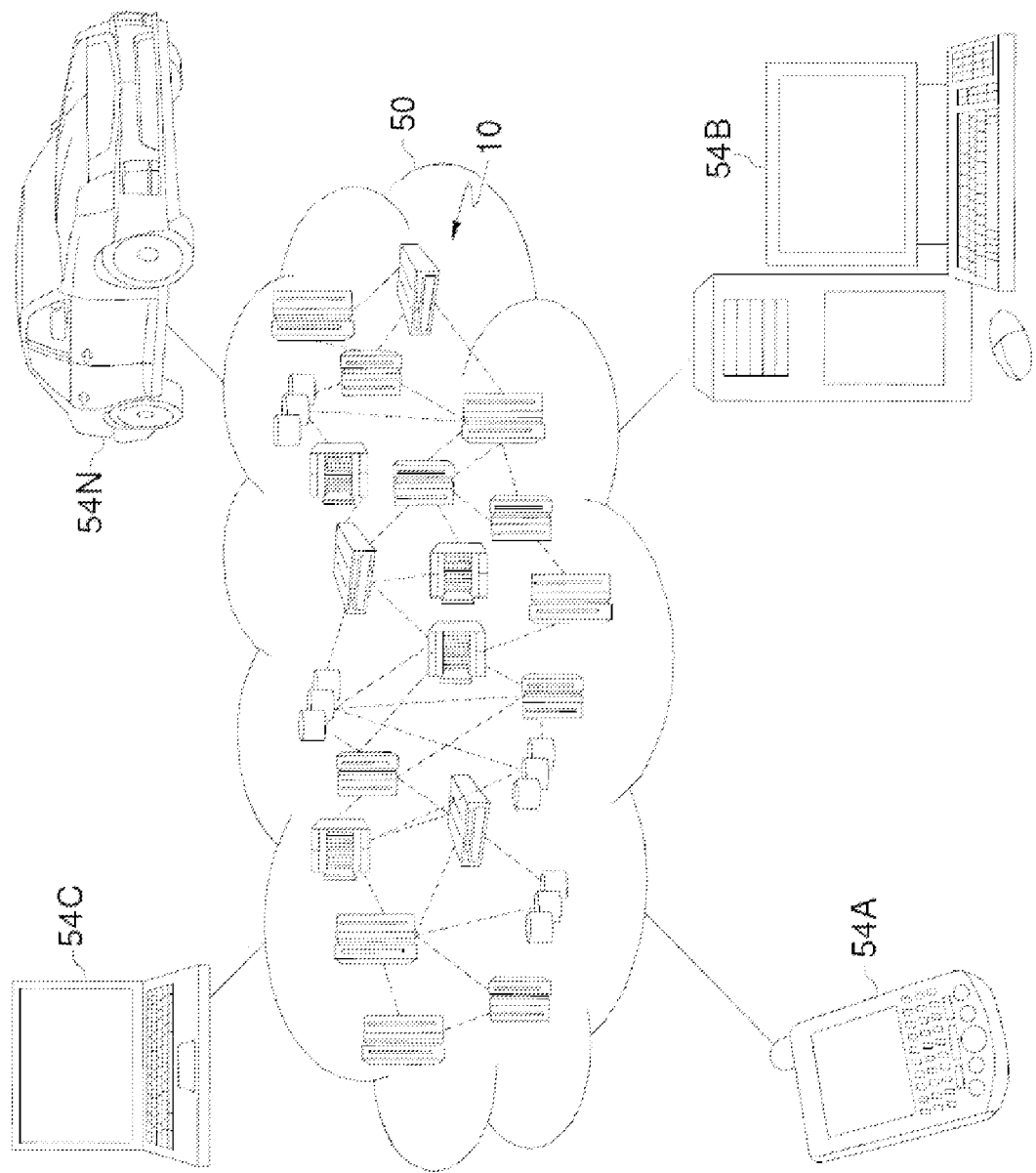
FIG. 2 depicts a cloud computing environment according to the first embodiment system.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network-addressable connection (for example, using a web browser).

Figure 3:
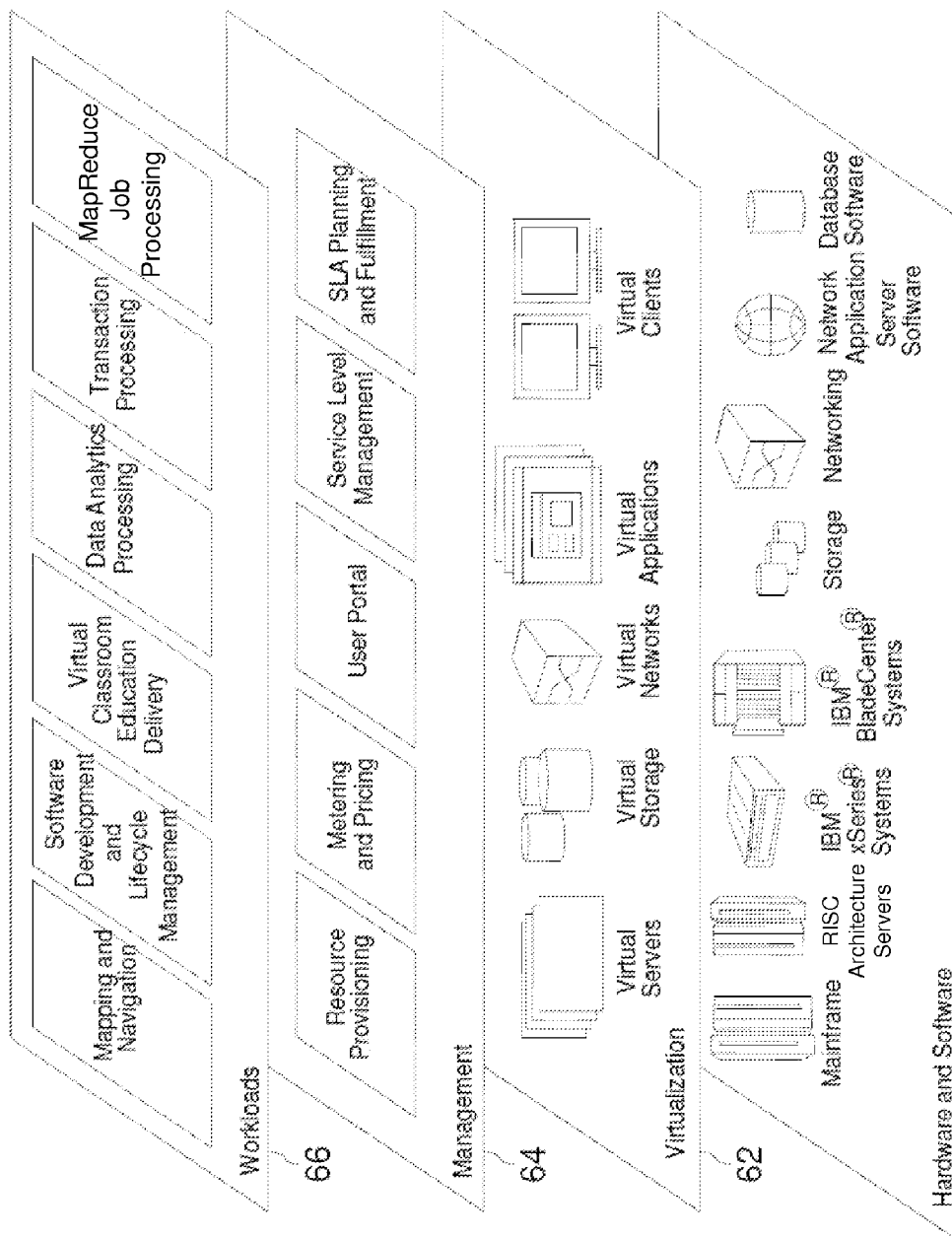
FIG. 3 depicts abstraction model layers according to the first embodiment system.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and MapReduce job processing.

II. Example Embodiment

Figures 4A, 4B:
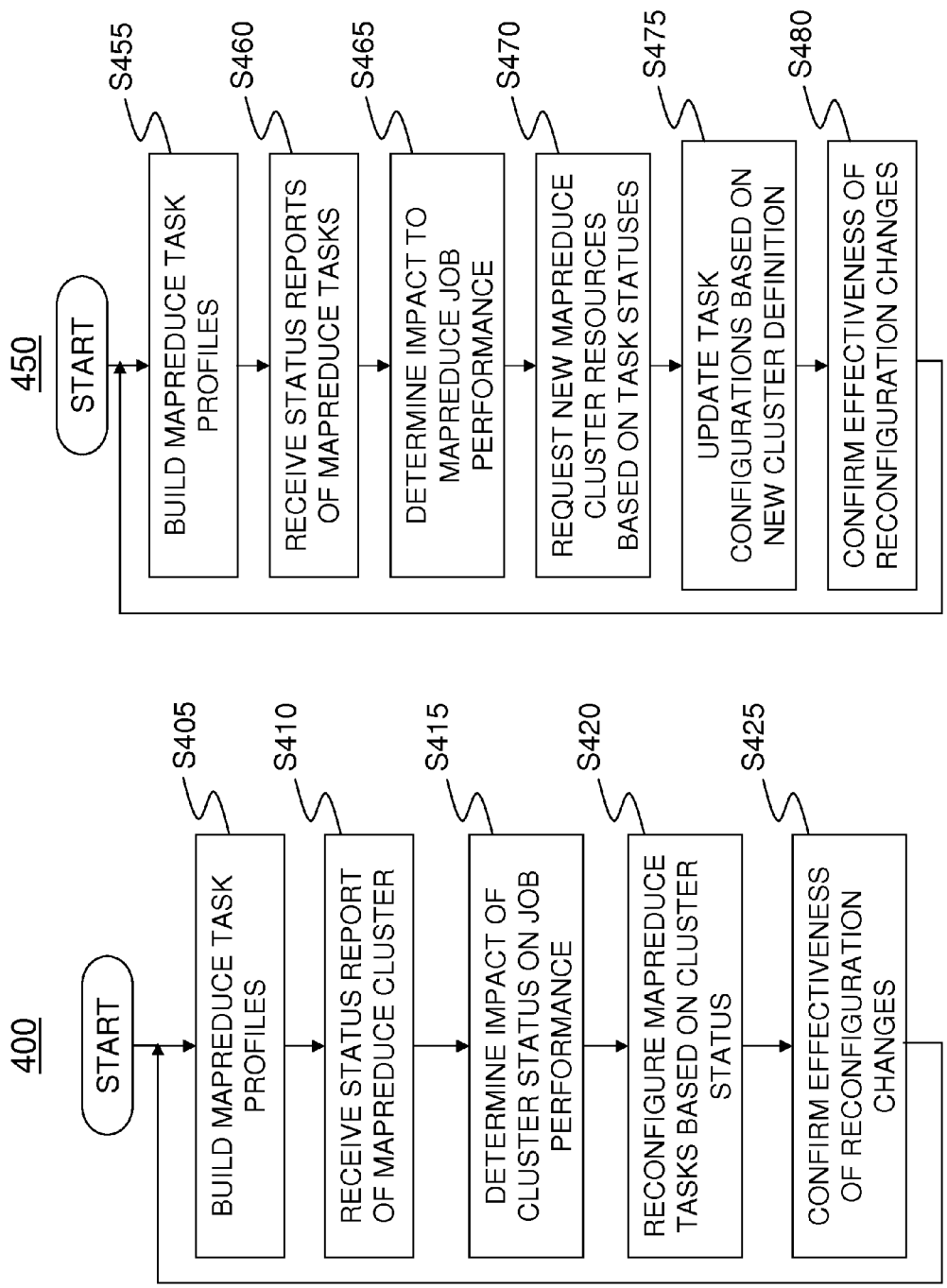
FIG. 4A is a first flowchart according to the first embodiment system.
FIG. 4B is a second flowchart according to the first embodiment system.
Figure 5:
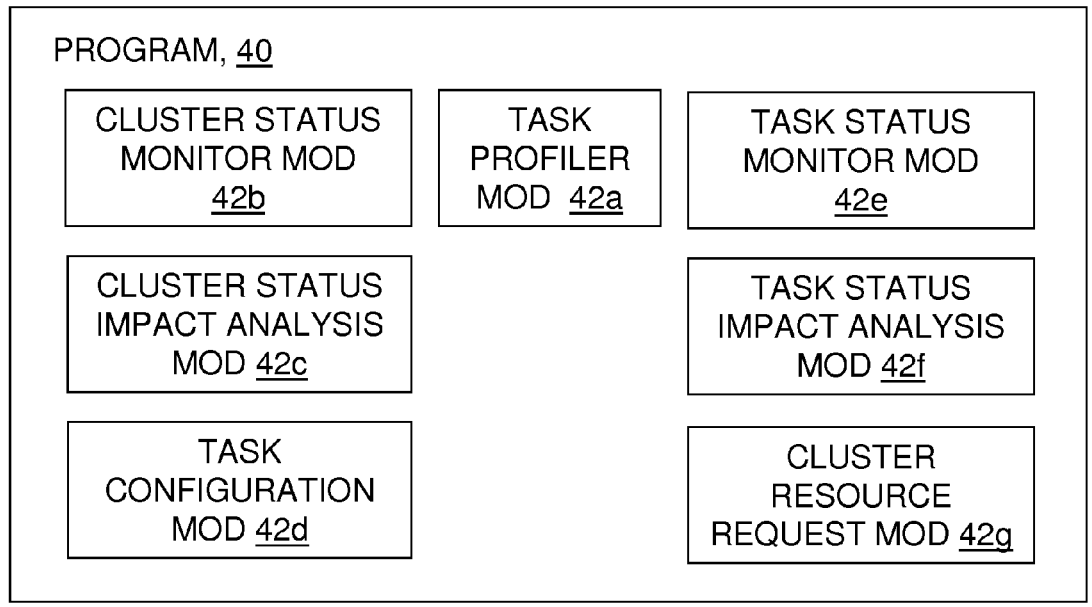
FIG. 5 is a block diagram view of a machine logic (for example, software) portion of the first embodiment system.

FIGS. 4A and 4B show flowcharts 400 and 450, respectively, each depicting a method according to the present invention. FIG. 5 shows program 40 (see also FIG. 1) for performing at least some of the method steps of flowcharts 400 and 450. Each method and associated software will now be discussed, over the course of the following paragraphs, with extensive reference to FIGS. 4A and 4B (for the method step blocks) and FIG. 5 (for the software blocks).

These methods presuppose that a MapReduce job has been launched and is running in a shared-resource environment. While a MapReduce job is used in these examples, the control processes used are similarly applicable to other forms of parallel, distributed processing. In any case, such a job may have many parameters whose settings can impact job performance. Some of these parameters can be tuned ahead of time based on static job characteristics ("static tuning"). Others can be tuned at run time based on dynamic job characteristics at the time the job is launched ("semi-static tuning"), or at the time a job task is launched ("semi-dynamic tuning"). Still others can be tuned in real time based on dynamic characteristics as observed during task execution ("dynamic tuning").

In each case, the characteristics on which parameter tuning can be based may come from a number of different categories. These categories may include, but are not necessarily limited to: (i) characteristics of the data, such as data volume or internal structure; (ii) characteristics of the analysis, such as whether the objective is to sum a set of integers or to determine the topic of written prose; (iii) characteristics of the execution environment independent of external influence ("independent environmental characteristics"), such as number of nodes assigned to the cluster or storage capacity of a particular node; (iv) characteristics of the execution environment that may be influenced by external factors ("interdependent environmental characteristics"), such as the amount of bandwidth available for data transfer to/from a shared physical or virtual machine, or current potential in floating-point operations per second of a virtual CPU whose physical hardware is shared with other virtual CPUs, and/or (v) status and performance metrics, such as average percentage of job completion per unit time. Environmental characteristics may in general be from any of the various layers of the resource stack, including the virtual machine or operating system layers and the underlying physical or hypervisor layers.

Likewise, characteristics of a MapReduce job which may be affected by parameter changes include, for example: (i) task-level characteristics, such as input data size to a given task, the location of data for a given task, or the amount of memory and/or processing resources allocated to a given task; (ii) job-level characteristics, such as the number of concurrent tasks, overall job progress, or the utilization ratio of resources in use to resources available; and/or (iii) cluster-level characteristics, such as the quantity and locations of specific resources that make up the MapReduce job cluster.

The methods of FIGS. 4A and 4B will discussed with these points in mind. Each method may be used independently of the other, or they may both be used together. More generally, they may incorporate being driven by, and/or driving changes to, any combination of characteristics and/or types of characteristics given above. Finally, they may be complementary to other optimization techniques, such as static tuning and semi-dynamic tuning.

FIG. 4A presents a method that dynamically adjusts the parameters of the MapReduce job based on the status of the MapReduce cluster. Processing begins at step S405, where, as the MapReduce job runs, task profiler module ("mod") 42a builds profiles for the mapper and reducer tasks. These profiles include characteristics about the tasks such as whether they are CPU and/or memory intensive.

Processing proceeds to step S410, where cluster status monitor mod 42b monitors the status of the MapReduce job cluster. This status includes information about resource utilization at layers underneath the layer of the guest operating systems on which the MapReduce job runs, such as CPU and memory utilization information about the physical machines which host cluster resources. In general, many types of information about performance at various levels of the cluster platform may be included. The cluster status is monitored as the MapReduce job runs so that parameters may be adjusted dynamically as need be in response to status changes.

Processing proceeds to step S415, where cluster status impact analysis mod 42c determines the significance of any change to cluster status. For example, performance of cluster CPU resources may be trending steadily downward, while task profile information indicates that CPU performance is crucial to timely job completion.

Processing proceeds to step S420, where, if cluster status impact mod determines that current cluster status or status trends will impact job performance, task configuration mod 42d determines what parameters to adjust and how to reconfigure them to optimize performance based on current or trending cluster conditions. Depending on the circumstances, this may include adjustments such as changes to input data size for mapper and/or reducer tasks, resource allocations to each task, and/or increasing or decreasing the number of concurrent tasks. Task-level configuration parameters may or may not be customized on a task-by-task basis. Continuing with the above example, task configuration mod 42d may decide to schedule fewer concurrent tasks (and may additionally decide to increase the data size of each new task) to reduce processor contention, thereby shifting critical processor resources to useful computation. Task configuration mod 42d then makes the appropriate adjustments to effect these changes.

Processing proceeds to step S425, where task status monitor mod 42e monitors task status to determine whether the parameter changes were effective in meeting the performance objectives occasioning the changes introduced in step S420, or whether different or additional measures may be necessary. The process then returns to step S405, repeating until the MapReduce job is complete. In this way, the process of FIG. 4A performs dynamic tuning of a MapReduce job based on interdependent characteristics of the MapReduce job environment.

FIG. 4B presents a method that dynamically requests a change to the MapReduce job cluster based on the status of the MapReduce job. Processing begins at step S455, where, as in the method of FIG. 4A, task profiler mod 42a builds profiles for the mapper and reducer tasks of the MapReduce job as it runs.

Processing proceeds to step S460, where task status monitor mod 42e monitors the status of the tasks associated with the MapReduce job, including factors such as CPU utilization, memory utilization, throughput, and/or task progress. Task profiling is a kind of monitoring that focuses on understanding the resource consumption characteristics of the execution of a certain task.

Processing proceeds to step S465, where task status impact analysis mod 42f determines the impact of task status on overall performance of the MapReduce job. For instance, overall job progress may be determined to be only 30% complete after 50% of allocated job time has been used.

Processing proceeds to step S470, where cluster resource request mod 42g decides, based on the analysis of the previous step, whether a change in the cluster resource configuration would be beneficial. If so, it decides what resource changes to request and submits this request to the cluster resource provisioning system. Continuing the previous example, cluster resource request mod 42g may determine that three additional nodes are now needed for the job to complete within the allotted time. It makes this request and receives a response indicating the new cluster configuration. Alternatively, perhaps job progress is far ahead of expectations and/or some cluster resources are not being fully utilized. In that case, cluster resource request mod 42g may make a request to scale down or otherwise reconfigure the cluster in order to minimize the quantity of resources reserved while simultaneously maximizing the utilization of those resources.

Processing proceeds to step S475, where task configuration mod 42d determines what parameters to adjust and how to reconfigure them to optimize performance based on the new cluster configuration. If no new cluster configuration was requested, task configuration mod 42d still analyzes the data from task status monitoring and impact analysis mods 42e and 42f to determine if task reconfiguration is nevertheless still desirable. Depending on the circumstances, this reconfiguration may include adjustments such as changes to input data size for mapper and/or reducer tasks, resource allocations to each task, and/or increasing or decreasing the number of concurrent tasks. Task-level configuration parameters may or may not be customized on a task-by-task basis. Continuing the above example, task configuration mod 42d decides that three extra nodes will allow 6 additional tasks to run concurrently. Task configuration mod 42d then makes the appropriate adjustments to realize these changes.

Processing proceeds to step S480, where task status monitor mod 42e monitors task status to determine whether the parameter changes were effective in meeting the performance objectives occasioning the changes introduced in step S470 and/or S475, or whether different or additional measures may be necessary. The process then returns to step S455, repeating until the MapReduce job is complete. In this way, the process of FIG. 4B performs dynamic tuning of cluster-level characteristics of a MapReduce job based on job status.

III. Further Comments and/or Embodiments

Some embodiments of the present invention recognize that conventional MapReduce execution practice involves the following steps: (i) a fixed set of resources (such as a particular number of nodes in a cluster or grid) is requested at the time a MapReduce job is submitted; (ii) a dedicated set of resources is then allocated at the time the MapReduce job is scheduled to run; (iii) the MapReduce job runs to completion; and (iv) the resources are released.

Further, some embodiments of the present invention recognize that to prepare for these executions, conventional, static MapReduce job performance is tuned in the following manner: (i) an initial parameter configuration is set; (ii) one or more test runs are conducted; (iii) a performance advisor consults execution results (such as job results, job counters, and system monitoring logs) to identify bottlenecks and inefficiencies offline; and (iv) the performance advisor sets a new job configuration based on its analysis. This cycle may then be repeated until a satisfactory level of performance is achieved.

However, some embodiments of the present invention recognize that there are a number of shortcomings to the conventional approaches. For example, the conventional approach to performance tuning described above may require many test runs, and for jobs that are long running or that will only be run once after testing, those test runs may not be worth the investment.

Moreover, some embodiments of the present invention recognize that tuning the performance of MapReduce jobs may involve many parameters, and that for at least some of these parameters, static tuning is insufficient. Instead, these embodiments recognize that the parameters of MapReduce jobs may include those from one or more of the following categories: (i) job-specific parameters that can be determined a priori and statically by analyzing the input data set; (ii) job-specific parameters that vary dynamically and which require dynamic monitoring and tuning for optimal performance; and/or (iii) a third set of parameters that affect the performance of MapReduce jobs when those jobs are run in a cloud environment using shared resources and services, and which require dynamic monitoring and tuning together with those jobs, taking into account the effects of the dynamically changing characteristics of the shared resources in the cloud.

These embodiments further recognize that the cloud environment presents potential issues—and opportunities—with respect to both performance and scaling. For instance, MapReduce job performance in shared resources varies over time, but conventional tuning approaches completely ignore performance effects due to resource sharing. Without real time coordination between cloud resource management and MapReduce job management, it is difficult or impossible to achieve the desired level of job performance. In addition, existing MapReduce implementations cannot scale in or out in real time. For instance, once a MapReduce job is started, extra compute nodes cannot be added to the cluster.

Some embodiments also recognize: (i) that cloud resource monitoring and provisioning are typically "transparent" in the sense that processes running in a cloud environment are unaware of resource details at lower layers of the cloud computing stack; (ii) that this transparency and lack of awareness are not ideal for system-level performance tuning, and/or (iii) that system-level performance tuning may be particularly beneficial in the case of large-scale, coordinated, and/or distributed processing such as that performed by MapReduce systems. For instance, in traditional computing a typical resource sharing mechanism is provided at the operating system level, where an operating system provides resource isolation for concurrent processes. In cloud computing, on the other hand, a hypervisor, which enables multiple virtual machines to run on the same physical machine, provides a resource isolation mechanism instead of or in addition to the resource isolation mechanism provided by the operating system(s). In the current cloud computing framework, hypervisors also provide resource transparency to the processes that runs on guest operating systems. What is therefore needed are hypervisors that provide resource utilization awareness to systems, such as MapReduce systems, that run on top of guest operating systems, allowing these systems to perform more effective performance tuning.

In appreciation of the above, some embodiments of the present invention conduct dynamic performance tuning of cloud-based MapReduce jobs by taking into account the performance of shared cloud resources. This performance data may include, for example: (i) cloud resource usage data; (ii) resource sharing and allocation decisions; and/or (iii) individual job status on mapper and reducer tasks.

Some embodiments may include a MapReduce configuration manager that periodically computes configuration parameters for mapper and reducer configurators by taking the collected performance data into account. Details about some of the ways configuration parameters for MapReduce jobs can be computed from available performance data can be found elsewhere (see, for example, Min Li et al., MRONLINE: MapReduce Online Performance Tuning, ACM Symposium on High-Performance Parallel and Distributed Computing 2014 (HPDC'14)). The newly updated configuration parameters are then sent to the mapper and reducer configurators, which implement the configuration manager decisions. In some embodiments, administrators can set configuration manager policies to optimize performance across all jobs taking into account such factors as available resources, sharing decisions, and/or usage patterns. In some embodiments, policies may also be set to optimize performance on a job-class basis when multi-class MapReduce jobs are scheduled. For example, MapReduce jobs belonging to Gold class may be configured with higher priority over Silver-class jobs, which in turn have higher priority over Bronze-class jobs. Some embodiments may seek to improve overall cloud performance by taking into account MapReduce job class.

Some embodiments of the present invention conduct dynamic performance tuning via one or both of the following control loops: (i) a control loop that reconfigures MapReduce jobs in real time if changes to the cluster impact job performance ("Control Loop 1"); and/or (ii) a control loop that reissues resource requests if predicted performance results cannot meet service level agreement commitments ("Control Loop 2").

Figure 6:
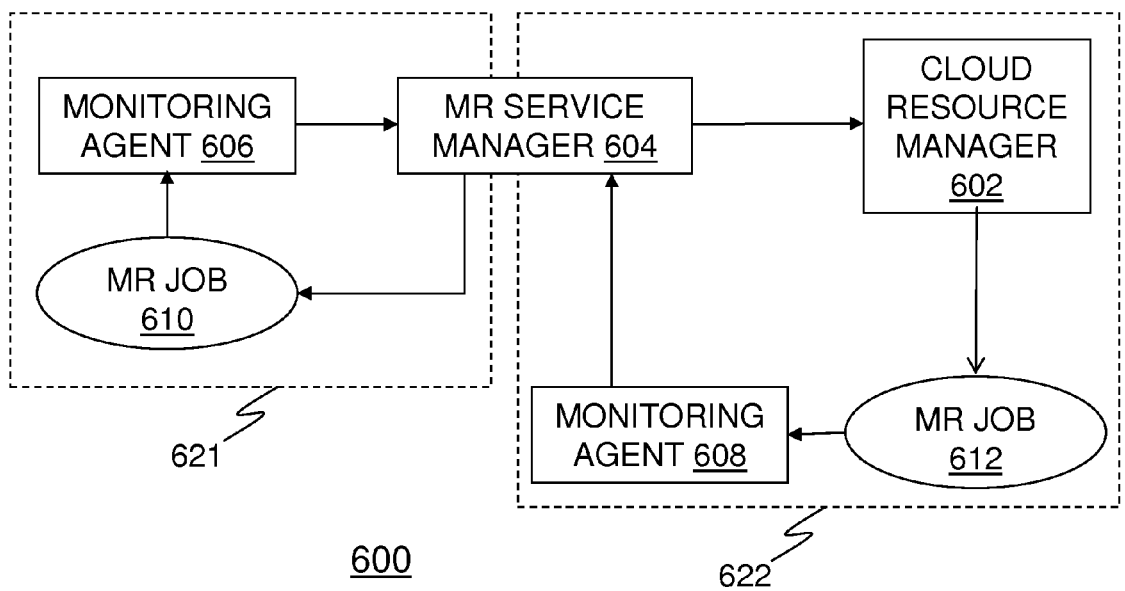
FIG. 6 is a diagram of a portion of a second embodiment system.

Shown in FIG. 6 is diagram 600 illustrating an embodiment system containing these two control loops. Diagram 600 includes: cloud resource manager 602; MapReduce service manager 604; MapReduce jobs 610 and 612; and monitoring agents 606 and 608. Control Loop 1 and Control Loop 2 are represented by dashed boxes 621 and 622, respectively. In Control Loop 1, monitoring agent 606 monitors MapReduce job 610 and cluster status and feeds back job performance information to MapReduce service manager 604. MapReduce service manager 604 analyzes this information and reconfigures MapReduce job 610 accordingly by dynamically tuning any of the various parameters of MapReduce job 610 that can be so tuned. The cycle then repeats. In Control Loop 2, monitoring agent 608 monitors MapReduce job 612 and feeds back job performance information to MapReduce service manager 604 in a manner similar to that in Control Loop 1. However, after MapReduce service manager 604 analyzes this information in Control Loop 2, it seeks to reconfigure the resource pool of MapReduce job 612 by issuing appropriate requests to cloud resource manager 602 (and then reconfigure MapReduce job 612 to best utilize the new resource pool). The cycle then repeats.

Figure 7:
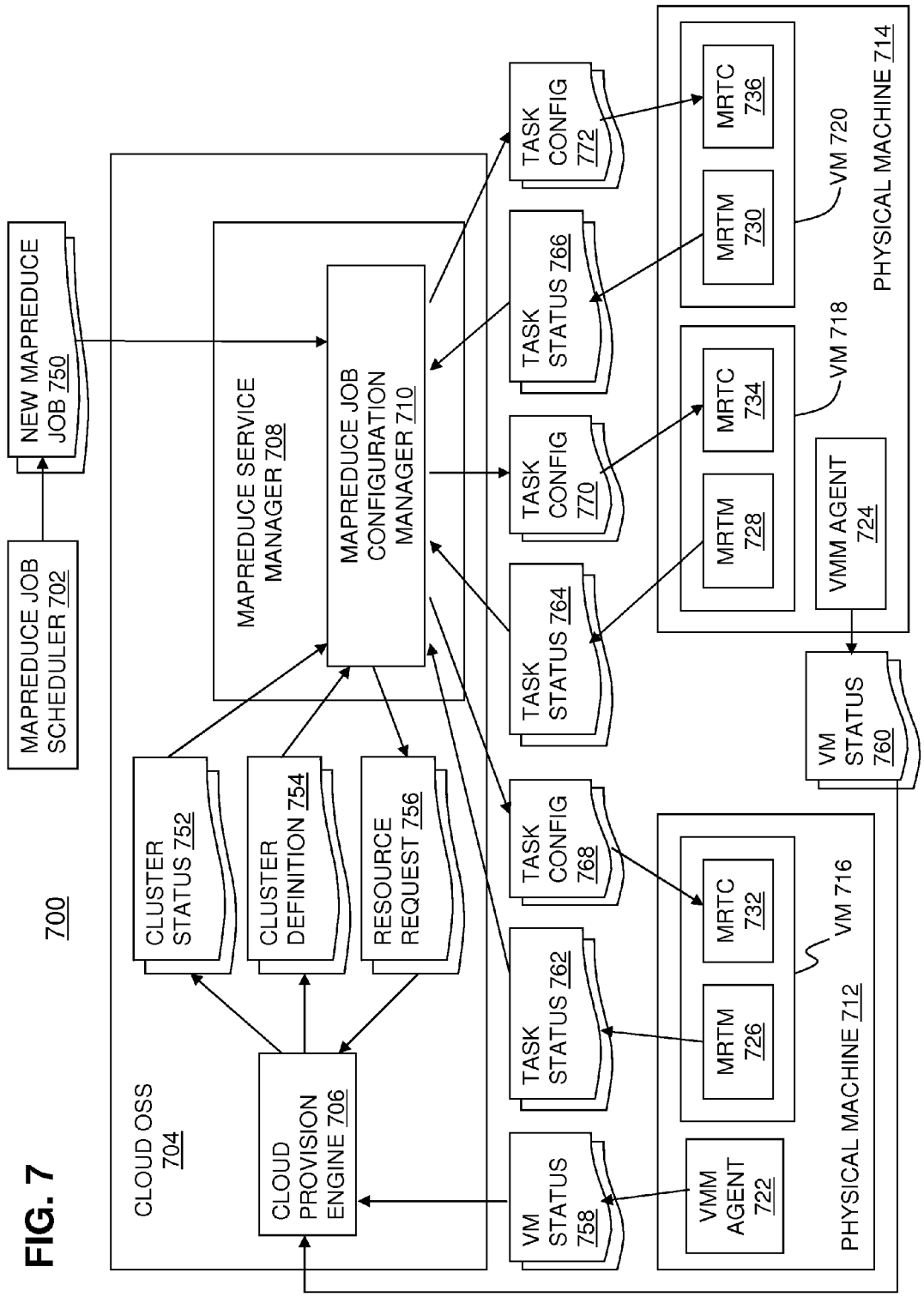
FIG. 7 is a diagram of a portion of a third embodiment system.

Shown in FIG. 7 is a more detailed view of another embodiment system, system 700, which also implements both control loops. System 700 includes the following components: MapReduce job scheduler 702; cloud operational support system (cloud OSS) 704; cloud provisioning engine 706; MapReduce service manager 708; MapReduce job configuration manager 710; physical machines 712 and 714; virtual machines 716, 718, and 720; virtual machine monitor agents 722 and 724; MapReduce task monitors 726, 728, and 730; and MapReduce task configurators 732, 734, and 736. System 700 also includes the following sets of data or action items: new MapReduce job 750; cluster status report 752; cluster definition 754; resource request 756; task configurations 768, 770, and 772; task status reports 762, 764, and 766; and virtual machine (VM) status reports 758 and 760.

Figure 8:
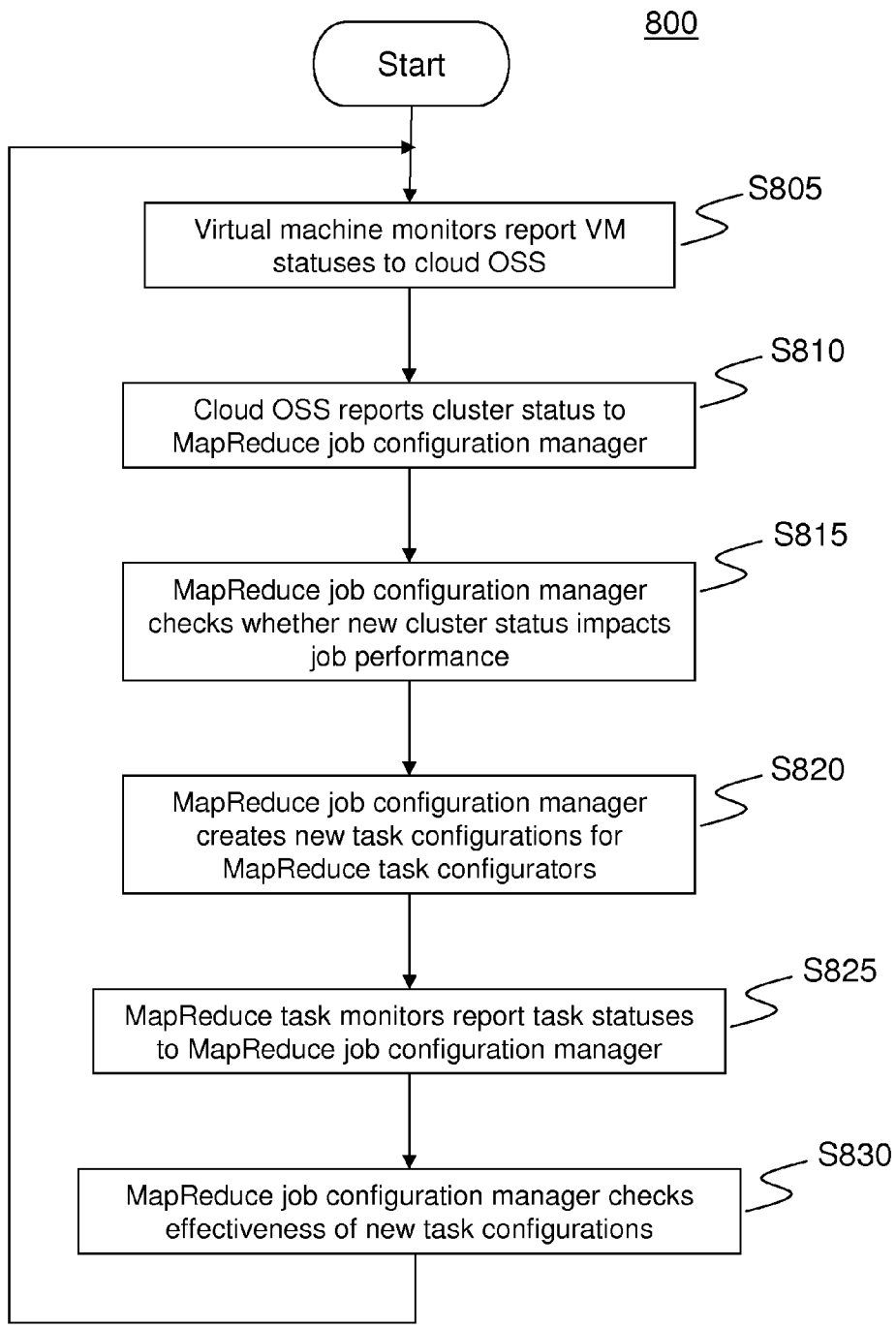
FIG. 8 is a first flowchart according to the third embodiment system.

Control Loop 1 will now be described with reference to FIG. 7, as well as to flowchart 800 in FIG. 8. As a precondition, MapReduce job scheduler 702 schedules MapReduce job 750 for execution in the cloud environment of system 700. MapReduce job configuration manager 710 sets an initial configuration for each MapReduce task (not shown) in job 750 via task configurations 768, 770, and 772. The tasks are dispatched to virtual machines 716, 718, and 720, and their respective configurations are set by MapReduce task configurators 732, 734, and 736. As MapReduce job 750 runs, MapReduce job configuration manager 710 dynamically builds a profile for the mapper/reducer tasks of MapReduce job 750 (not shown in flowchart 800). The profile is built via task status reports 762, 764, and 766, produced by MapReduce task monitors 726, 728, and 730, respectively, and includes information relevant for parameter tuning, such as whether the tasks are CPU intensive and/or memory intensive.

Meanwhile, in step S805, virtual machine monitors 722 and 724 report the status of virtual machines 716, 718, and 720 via VM status reports 758 and 760 to cloud provisioning engine 706 of cloud OSS 704. In step S810, cloud OSS 704 uses this information to determine the status of the MapReduce job cluster, which it reports to MapReduce job configuration manager 710 via cluster status report 752. In step S815, MapReduce job configuration manager 710 analyzes this information to determine whether the new cluster status impacts the performance of MapReduce job 750.

If the performance of MapReduce job 750 is impacted, MapReduce job configuration manager 710 identifies parameters to adjust in step S820 in order to optimize performance in light of the new cluster status. These parameters may include, for example: (i) the size of the inputs to mapper/reducer tasks; (ii) the resource allocations for mapper/reducer tasks; and/or (iii) the number of mapper/reducer tasks to run concurrently. New task configurations 768, 770, and 772 are then created with the appropriate parameters adjusted to new values for consumption by MapReduce task configurators 732, 734, and 736 through programmable interfaces (new tasks may be launched, and configured appropriately, as well). MapReduce task monitors 726, 728, and 730 report updated task statuses, which reflect the configuration changes, to MapReduce job configuration manager 710 in step S825. Finally, in step S830, MapReduce job configuration manager 710 validates the effectiveness of the task configuration changes and makes additional adjustments if necessary. The process then repeats from step S805 to complete the control loop. In this way, Control Loop 1 dynamically re-configures MapReduce job 750 based on cluster status throughout its lifetime.

Figure 9:
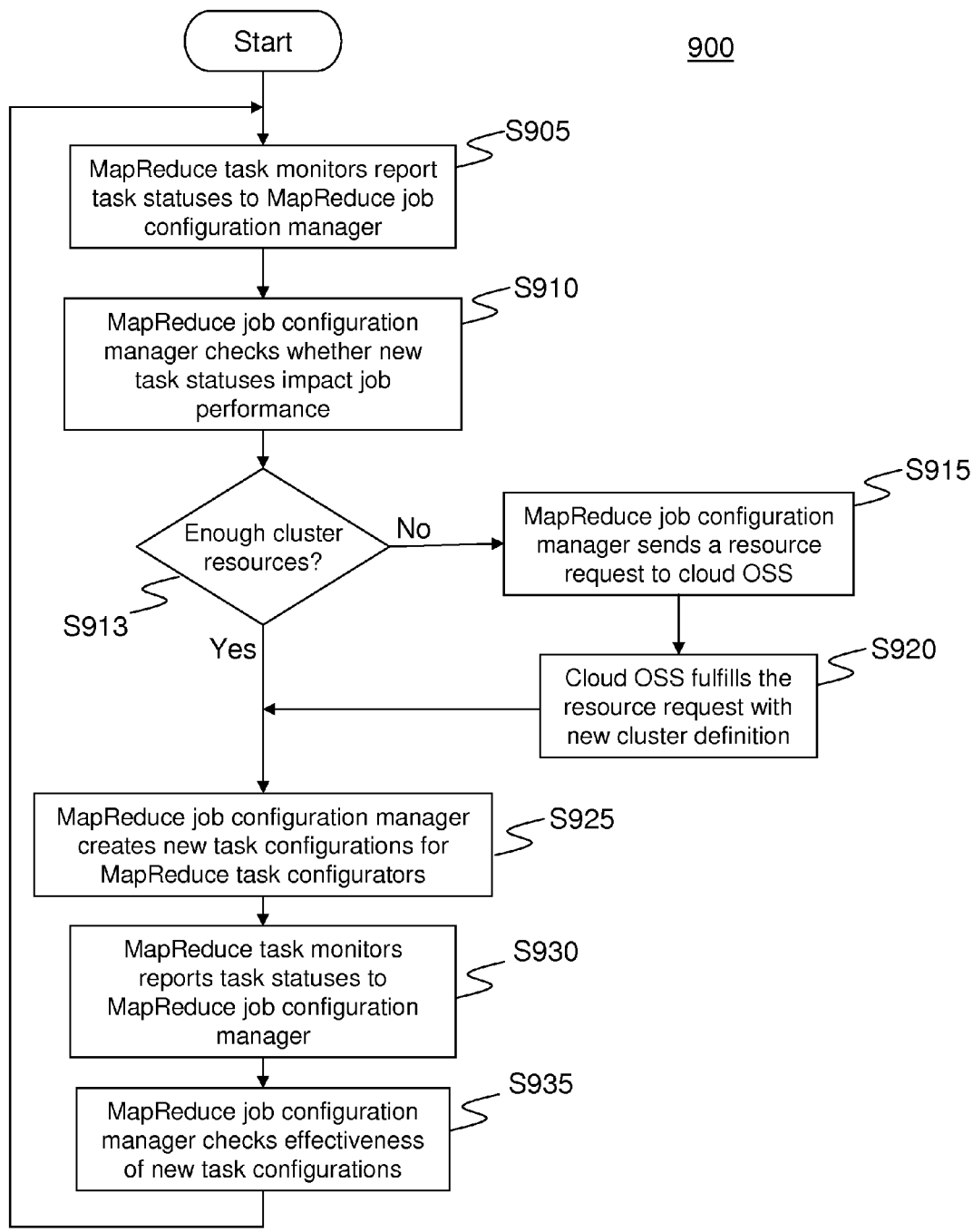
FIG. 9 is a second flowchart according to the third embodiment system.

Control Loop 2 will now be described, also with reference to FIG. 7, as well as to flowchart 900 in FIG. 9. The preconditions for Control Loop 2 are similar to those for Control Loop 1, including dynamic creation of task profiles that track characteristics such as whether tasks are CPU heavy and/or memory heavy. As such, these preconditions will not be repeated here.

Control Loop 2 begins with step S905, where MapReduce task monitors 726, 728, and 730 report task statuses for the tasks of MapReduce job 750 to MapReduce job configuration manager 710. MapReduce job configuration manager 710 uses these status reports to monitor various characteristics of running mapper/reducer tasks, such as CPU utilization, memory utilization, progress, and/or throughput. Based on an analysis of new task status data, MapReduce job configuration manager 710 determines whether or not job performance is impacted in step S910. If so, MapReduce job configuration manager 710 determines whether or not more cluster resources are needed in step S913.

If performance targets can be met by job reconfiguration only, processing skips to step S925, described below. On the other hand, if more cluster resources are required to meet performance targets or otherwise overcome job delays, processing proceeds to step S915, where MapReduce job configuration manager 710 sends a resource request to cloud provisioning engine 706 of cloud OSS 704 to request new cluster resources. In step S920, cloud provisioning engine 706 of cloud OSS 704 fulfills the resource request with new cluster definition 754. Among other items, the new cluster may include additional virtual machines running on the same or additional physical machines.

In step S925, if a new cluster definition was received, MapReduce job configuration manager 710 identifies the parameters to adjust based on the new assigned cluster resources, such as: (i) the size of inputs to mapper/reducer tasks; (ii) the resource allocations for mapper/reducer tasks; and/or (iii) the number of mapper/reducer tasks running concurrently. In any case, once the parameters to adjust are determined, MapReduce job configuration manager 710 creates new task configurations 768, 770, and 772 for MapReduce task configurators 732, 734, and 736, respectively, adjusting the parameters to new values through programmable interfaces. (If new tasks were added, new configurators, configurations, and monitors would be included for them as well.)

As the tasks of MapReduce job 750 continue to run with their new configurations, MapReduce task monitors 726, 728, and 730 report updated task statuses for their respective tasks to MapReduce job configuration manager 710 in step S930. MapReduce job configuration manager 710 then validates the effectiveness of the adjusted task configurations in step S935. The process then repeats from step S905 to complete the control loop. In this way, Control Loop 2 dynamically re-issues cluster resource requests and re-configures MapReduce job 750 based on job status throughout its lifetime.

Control Loop 1 and Control Loop 2 are similar in that they both permit dynamic reconfiguration of MapReduce jobs based on job status monitoring. In the case of Control Loop 1, the focus is on reconfiguring a MapReduce job based on dynamic cluster status analysis within current cluster constraints, while with Control Loop 2, the emphasis is on re-defining the cluster itself based on over- or under-provisioning of platform resources as determined by dynamic job performance data. Each control loop may be used independently of the other, or they may both be used for a given MapReduce job.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Receive/provide/send/input/output: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Cluster: a collection of computing devices coordinated for the purpose of performing a specific computation, or job; encompasses both collections of relatively homogeneous devices as well as collections, often referred to as "grids," in which the devices are relatively more heterogeneous.

What is claimed is:

1. A method comprising:
   beginning execution of a MapReduce job by a computing resources cluster constituted by an initial plurality of computing resources, the execution of the MapReduce job by the computing resources cluster is characterized, at the time of the beginning of execution, by an initial configuration of a plurality of job parameters; and
   during execution of the MapReduce job, performing at least one time, a first control loop that includes at least the following operations:
      build a current usage profile including information about usage of at least some of the computing resources of the computing resources cluster,
      reconfiguring one, or more, job parameters of the plurality of job parameters, based, at least in part, on the usage profile so that the execution of the MapReduce job by the computing resources cluster is characterized by an updated configuration of the plurality of job parameters, and
      continuing execution of the Map Reduce job by the computing resources cluster using the updated configuration.

2. The method of claim 1 wherein:
   the computing resources cluster includes a plurality of memory resources and a plurality of processing resources;
   the usage profile includes information about an intensity of use of the memory resources of the plurality of memory resources; and
   the usage profile further includes information about an intensity of use of the processing resources of the plurality of processing resources.

3. The method of claim 1 wherein:
   the plurality of parameters include at least the following parameters: an input size used by a plurality of mapper/reducer components, a resource allocation for the plurality of mapper/reducer components, and a number of concurrent mapper/reducer components; and
   the reconfiguration of one, or more, job parameters includes reconfiguration of at least one of the following parameters: the input size used by the plurality of mapper/reducer components, the resource allocation for the plurality of mapper/reducer components, and the number of concurrent mapper/reducer components.

4. The method of claim 1 wherein the first control loop further includes the following operation:
   validating an effectiveness level of the reconfiguration of the one, or more, job parameters with respect to continuing execution of the MapReduce job.

5. The method of claim 1 further comprising:
   during execution of the MapReduce job, performing at least one time, a second control loop that includes at least the following operations:
      determining, based on the current usage profile and characteristics of the first plurality of computing resources, that execution of the MapReduce job by the cluster of computing resources would benefit from addition of additional computing resource(s) to the computing resources cluster, and
      adding a set of computing resource(s) to the computing resource(s) cluster so that the computing resources cluster is constituted by an updated plurality of computing resources.

6. The method of claim 1 further comprising:
during execution of the MapReduce job, performing at least one time, a second control loop that includes at least the following operations:
determining, based on the current usage profile and characteristics of the first plurality of computing resources, that execution of the MapReduce job by the cluster of computing resources would not be impaired by removing of computing resource(s) from the computing resources cluster, and
removing a set of computing resource(s) from the computing resource(s) cluster so that the computing resources cluster is constituted by an updated plurality of computing resources.

7. A computer program product comprising a computer readable non-transitory storage medium having stored thereon:
program instructions programmed to begin execution of a MapReduce job by a computing resources cluster constituted by an initial plurality of computing resources, the execution of the MapReduce job by the computing resources cluster is characterized, at the time of the beginning of execution, by an initial configuration of a plurality of job parameters; and
program instructions programmed to during execution of the MapReduce job, perform at least one time, a first control loop that includes at least the following operations:
build a current usage profile including information about usage of at least some of the computing resources of the computing resources cluster,
reconfiguring one, or more, job parameters of the plurality of job parameters, based, at least in part, on the usage profile so that the execution of the MapReduce job by the computing resources cluster is characterized by an updated configuration of the plurality of job parameters, and
continuing execution of the Map Reduce job by the computing resources cluster using the updated configuration.

8. The computer program product of claim 7 wherein:
the computing resources cluster includes a plurality of memory resources and a plurality of processing resources;
the usage profile includes information about an intensity of use of the memory resources of the plurality of memory resources; and
the usage profile further includes information about an intensity of use of the processing resources of the plurality of processing resources.

9. The computer program product of claim 7 wherein:
the plurality of parameters include at least the following parameters: an input size used by a plurality of mapper/reducer components, a resource allocation for the plurality of mapper/reducer components, and a number of concurrent mapper/reducer components; and
the reconfiguration of one, or more, job parameters includes reconfiguration of at least one of the following parameters: the input size used by the plurality of mapper/reducer components, the resource allocation for the plurality of mapper/reducer components, and the number of concurrent mapper/reducer components.

10. The computer program product of claim 7 wherein the first control loop further includes the following operation:
validating an effectiveness level of the reconfiguration of the one, or more, job parameters with respect to continuing execution of the MapReduce job.

11. The computer program product of claim 7 wherein the medium has further stored thereon:
program instructions programmed to, during execution of the MapReduce job, perform at least one time, a second control loop that includes at least the following operations:
determine, based on the current usage profile and characteristics of the first plurality of computing resources, that execution of the MapReduce job by the cluster of computing resources would benefit from addition of additional computing resource(s) to the computing resources cluster, and
add a set of computing resource(s) to the computing resource(s) cluster so that the computing resources cluster is constituted by an updated plurality of computing resources.

12. The computer program product of claim 7 wherein the medium has further stored thereon:
program instructions programmed to, during execution of the MapReduce job, perform at least one time, a second control loop that includes at least the following operations:
determine, based on the current usage profile and characteristics of the first plurality of computing resources, that execution of the MapReduce job by the cluster of computing resources would not be impaired by removing of computing resource(s) from the computing resources cluster, and
remove a set of computing resource(s) from the computing resource(s) cluster so that the computing resources cluster is constituted by an updated plurality of computing resources.

13. A computer system comprising:
a processor(s) set; and
a computer readable storage medium;
wherein:
the processor set is structured, located, connected and/or programmed to run program instructions stored on the computer readable storage medium; and
the program instructions include:
program instructions programmed to begin execution of a MapReduce job by a computing resources cluster constituted by an initial plurality of computing resources, the execution of the MapReduce job by the computing resources cluster is characterized, at the time of the beginning of execution, by an initial configuration of a plurality of job parameters, and
program instructions programmed to during execution of the MapReduce job, perform at least one time, a first control loop that includes at least the following operations:
build a current usage profile including information about usage of at least some of the computing resources of the computing resources cluster,
reconfiguring one, or more, job parameters of the plurality of job parameters, based, at least in part, on the usage profile so that the execution of the MapReduce job by the computing resources cluster is characterized by an updated configuration of the plurality of job parameters, and
continuing execution of the Map Reduce job by the computing resources cluster using the updated configuration.

14. The computer system of claim 13 wherein:
the computing resources cluster includes a plurality of memory resources and a plurality of processing resources;

the usage profile includes information about an intensity of use of the memory resources of the plurality of memory resources; and the usage profile further includes information about an intensity of use of the processing resources of the plurality of processing resources.

15. The computer system of claim 13 wherein:

the plurality of parameters include at least the following parameters: an input size used by a plurality of mapper/reducer components, a resource allocation for the plurality of mapper/reducer components, and a number of concurrent mapper/reducer components; and the reconfiguration of one, or more, job parameters includes reconfiguration of at least one of the following parameters: the input size used by the plurality of mapper/reducer components, the resource allocation for the plurality of mapper/reducer components, and the number of concurrent mapper/reducer components.

16. The computer system of claim 13 wherein the first control loop further includes the following operation:

validating an effectiveness level of the reconfiguration of the one, or more, job parameters with respect to continuing execution of the MapReduce job.

17. The computer system of claim 13 wherein the medium has further stored thereon:

program instructions programmed to, during execution of the MapReduce job, perform at least one time, a second control loop that includes at least the following operations:

determine, based on the current usage profile and characteristics of the first plurality of computing resources, that execution of the MapReduce job by the cluster of computing resources would benefit from addition of additional computing resource(s) to the computing resources cluster, and add a set of computing resource(s) to the computing resource(s) cluster so that the computing resources cluster is constituted by an updated plurality of computing resources.

18. The computer system of claim 13 wherein the medium has further stored thereon:

program instructions programmed to, during execution of the MapReduce job, perform at least one time, a second control loop that includes at least the following operations:

determine, based on the current usage profile and characteristics of the first plurality of computing resources, that execution of the MapReduce job by the cluster of computing resources would not be impaired by removing of computing resource(s) from the computing resources cluster, and remove a set of computing resource(s) from the computing resource(s) cluster so that the computing resources cluster is constituted by an updated plurality of computing resources.

* * * * *